United States Patent
Shiomi et al.

(10) Patent No.: US 9,464,578 B2
(45) Date of Patent: Oct. 11, 2016

(54) ACCELERATOR-PEDAL REACTION FORCE CONTROL APPARATUS

(75) Inventors: Masao Shiomi, Sagamihara (JP); Shigeyuki Sakaguchi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1134 days.

(21) Appl. No.: 12/999,426

(22) PCT Filed: Jul. 31, 2009

(86) PCT No.: PCT/IB2009/006417

§ 371 (c)(1),
(2), (4) Date: Dec. 16, 2010

(87) PCT Pub. No.: WO2010/013130

PCT Pub. Date: Feb. 4, 2010

(65) Prior Publication Data

US 2011/0098901 A1    Apr. 28, 2011

(30) Foreign Application Priority Data

Jul. 31, 2008 (JP) .................................. 2008-197387
May 21, 2009 (JP) .................................. 2009-123002

(51) Int. Cl.
- *G06F 7/70* (2006.01)
- *F02D 11/02* (2006.01)
- *B60K 26/02* (2006.01)

(52) U.S. Cl.
CPC ............. *F02D 11/02* (2013.01); *B60K 26/021* (2013.01)

(58) Field of Classification Search
CPC ... F02D 11/02; B60K 26/021; B60T 8/1755; B60T 8/172; B60T 7/22; B60W 10/18; B60W 10/184
USPC .................. 701/70, 79, 36, 56, 50; 180/170; 477/120
See application file for complete search history.

(56) References Cited

U.S. PATENT DOCUMENTS

| 7,022,045 B2 * | 4/2006 | Yone ..................... B60K 31/00 180/170 |
| 7,076,358 B2 * | 7/2006 | Egami ................ B60K 31/0008 701/70 |

(Continued)

FOREIGN PATENT DOCUMENTS

| CN | 1463866 A | 12/2003 |
| JP | 5-231194 A | 9/1993 |

(Continued)

OTHER PUBLICATIONS

International Preliminary Report on Patentability in PCT Application PCT/IB2009/006417, dated Feb. 10, 2011 (5 pages).

(Continued)

*Primary Examiner* — Shardul Patel
(74) *Attorney, Agent, or Firm* — Osha Liang LLP

(57) ABSTRACT

A control apparatus includes a means for detecting a position and a means for adjusting a reaction force of the accelerator, wherein the means for adjusting increases the reaction force of the accelerator by an increase amount in addition to a basic reaction force when the position of the accelerator is increased to satisfy a predetermined condition associated with a specific fuel consumption of the vehicle, the means for adjusting sets the increase amount to a first amount when the position of the accelerator is increased from a first accelerator position in a preload area to a second accelerator position that satisfies the predetermined condition, the means for adjusting sets the increase amount to a second amount when the position of the accelerator position is increased from an intermediate accelerator position that exceeds the preload area to the second position, and the first amount is greater than the second amount.

20 Claims, 10 Drawing Sheets

(56) References Cited

U.S. PATENT DOCUMENTS

| | | | | |
|---|---|---|---|---|
| 2003/0190996 A1* | 10/2003 | Yone | ................. | B60K 31/00 |
| | | | | 477/120 |
| 2003/0236602 A1* | 12/2003 | Kuge | ................. | B60T 17/18 |
| | | | | 701/36 |
| 2005/0056253 A1* | 3/2005 | Yone | ................. | F02D 11/106 |
| | | | | 123/399 |
| 2009/0240404 A1* | 9/2009 | Matsuyawa | ............ | F02D 29/04 |
| | | | | 701/50 |

FOREIGN PATENT DOCUMENTS

| | | |
|---|---|---|
| JP | 9-207604 A | 8/1997 |
| JP | 2004-197647 A | 7/2004 |
| JP | 2004-314871 A | 11/2004 |
| JP | 2005-132225 A | 5/2005 |
| JP | 2007-076468 A | 3/2007 |
| WO | 2007/080731 A1 | 7/2007 |

OTHER PUBLICATIONS

Chinese Office Action issued in CN Patent Application No. 200980126214.0, dated Nov. 5, 2012 (5 pages).

Extended European Search Report in counterpart European Application No. EP09802584.4 issued Feb. 19, 2014 (7 pages).

* cited by examiner

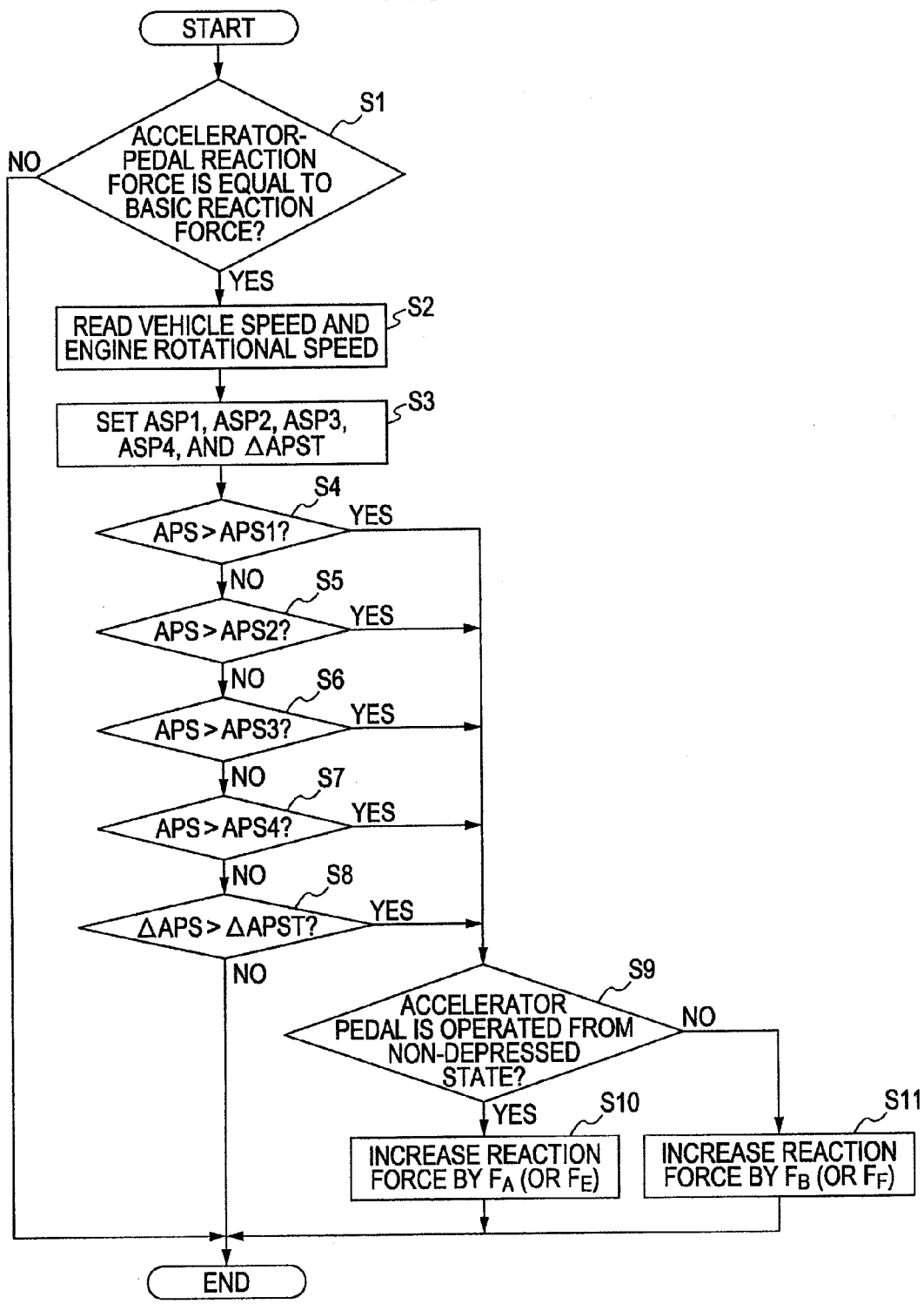

ACCELERATOR-PEDAL REACTION FORCE CONTROL APPARATUS

CROSS-REFERENCE TO RELATED APPLICATIONS

The present application claims priority from Japanese Patent Application No. 2008-197387, filed Jul. 31, 2008 and Japanese Patent Application No. 2009-123002, filed May 21, 2009. The contents of both priority applications are hereby incorporated by reference in their entirety.

BACKGROUND OF THE DISCLOSURE

1. Field of the Disclosure

The present disclosure relates to an accelerator-pedal reaction force control apparatus which controls a reaction force of an accelerator pedal.

2. Description of the Related Art

Japanese Unexamined Patent Application Publication No. 2007-76468 (hereinafter referred to as Patent Document 1) discloses a technique for allowing a driver to recognize an optimum amount of operation of an accelerator pedal by increasing an operation reaction force (hereinafter simply referred to as a reaction force) of the accelerator pedal stepwise at the optimum amount of operation of the accelerator pedal, that is, an optimum accelerator opening degree, at which an optimum specific fuel consumption can be obtained.

Patent Document 1 also discloses an operation of reducing the amount of increase in the reaction force to allow the acceleration of the vehicle if the operating speed of the accelerator pedal is high.

According to the technique described in Patent Document 1, the reaction force of the accelerator pedal is increased at a certain accelerator opening degree to avoid an increase in the specific fuel consumption. However, the accelerator pedal is a main operating member operated by the driver to drive the vehicle in a way that the driver desires, and the operational feel of the accelerator pedal experienced by the driver is extremely delicate. For this reason, this type of reaction-force control apparatus, which contributes to the reduction in fuel consumption, cannot be put into practical use unless the function for reducing the fuel consumption can be achieved together with satisfactory operational feel of the accelerator pedal.

Various tests have been performed for putting the reaction-force control apparatus which contributes to the reduction in fuel consumption into practical use. As a result of these tests, it was found that when the reaction force is increased at a certain accelerator opening degree to cause the driver to recognize the increase in the specific fuel consumption, as in Patent Document 1, the amount of increase in the reaction force (amount of increase from a basic reaction force) must be set in consideration of various factors, and there is room for improvement in the method for setting the amount of increase.

Generally, the accelerator pedal has a basic reaction force which corresponds to the accelerator opening degree. When the reaction force is increased at a certain accelerator opening degree, the sum of the basic reaction force and the amount of increase in the reaction force is applied to the foot of the driver. However, even if the amount of increase in the reaction force is constant, the driver feels the increase in the reaction force differently in accordance with the state in which the accelerator pedal has been depressed before the increase in the reaction force, for example, in accordance with the basic reaction force and the manner in which the basic reaction force has been changed before the increase in the reaction force. For example, it is generally more difficult for the driver to recognize the change in force required to depress the accelerator pedal when the reaction force is increased by the same amount at the same accelerator opening degree in the case in which the accelerator opening degree is increased from an intermediate accelerator opening degree as well as the case in which the accelerator opening degree is increased from 0 degrees, such as in the case where the vehicle is started running from a stopped state. Therefore, there is a risk that the optimum amount of operation cannot be recognized by the driver.

SUMMARY OF THE CLAIMED SUBJECT MATTER

In one aspect, the present disclosure relates to an accelerator control apparatus of a vehicle including a means for detecting a position of an accelerator, a means for adjusting a reaction force of the accelerator, the accelerator configured to receive a basic reaction force which increases as an accelerator opening degree increases, and wherein the means for adjusting increases the reaction force of the accelerator by an increase amount in addition to the basic reaction force when the position of the accelerator is increased to satisfy a predetermined condition associated with a specific fuel consumption of the vehicle, wherein the means for adjusting sets the increase amount to a first amount when the position of the accelerator is increased from a first accelerator position in a preload area to a second accelerator position that satisfies the predetermined condition, wherein the means for adjusting sets the increase amount to a second amount when the position of the accelerator is increased from an intermediate accelerator position that exceeds the preload area to the second position, and wherein the first amount is greater than the second amount.

In another aspect, the present disclosure relates to an accelerator control apparatus including a vehicle accelerator receiving a basic reaction force increasing as a position of the vehicle accelerator increases, a means for detecting the position of the accelerator, a means for adjusting a reaction force of the accelerator, and wherein the means for adjusting increases the reaction force of the accelerator from the basic reaction force when the position of the accelerator is increased to satisfy a predetermined condition that is associated with a specific fuel consumption of the vehicle, wherein the basic reaction force increases from a first position of the accelerator to a second position of the accelerator at a second rate of force increase when the position of the accelerator is increased, wherein the basic reaction force increases at a first rate of force increase which is larger than the second rate of force increase in accordance with an increase in the position of the accelerator from a zero position to the first position, and wherein the means for adjusting increases the reaction force by a second amount from the basic reaction force when the position of the accelerator is increased from an intermediate accelerator position that is larger than the first position to a position that satisfies the predetermined condition, and by a first amount when the position of the accelerator is increased from the position that is equal to the zero position or less than the first position to the position that satisfies the predetermined condition, the first amount being larger than the second amount.

In another aspect, embodiments disclosed herein relate to a method to control an accelerator of a vehicle including detecting a position of an accelerator, adjusting a reaction force of the accelerator, applying a basic reaction force to the accelerator which increases as an accelerator opening degree increases, and increasing the reaction force of the accelerator by an increase amount in addition to the basic reaction force when the position of the accelerator is increased to satisfy a predetermined condition associated with a specific fuel consumption of the vehicle, setting the increase amount to a first amount when the position of the accelerator is increased from a first accelerator position to a second accelerator position that satisfies the predetermined condition, setting the increase amount to a second amount when the position of the accelerator position is increased from an intermediate accelerator position to the second position, wherein the accelerator opening degree of the intermediate accelerator position is larger than the accelerator opening degree of the first accelerator position, wherein the first amount is greater than the second amount.

In another aspect, embodiments disclosed herein relate to an accelerator control apparatus of a vehicle including a detector to detect a position of an accelerator, a controller to adjust a reaction force of the accelerator, wherein, the accelerator is configured to receive a basic reaction force which increases as an accelerator opening degree increases, wherein the controller is configured to increase the reaction force of the accelerator by an increase amount in addition to the basic reaction force when the position of the accelerator is increased to satisfy a predetermined condition associated with a specific fuel consumption of the vehicle, wherein the controller is configured to set the increase amount to a first amount when the position of the accelerator is increased from a first accelerator position to a second accelerator position that satisfies the predetermined condition, wherein the controller is configured to set the increase amount to a second amount when the position of the accelerator is increased from an intermediate accelerator position to the second position, wherein the accelerator opening degree of the intermediate accelerator position is larger than the accelerator opening degree of the first accelerator position, and wherein the first amount is greater than the second amount.

In another aspect, embodiments disclosed herein relate to an accelerator control apparatus including a vehicle accelerator receiving a basic reaction force increasing as a depression of the vehicle accelerator increases, a detector to detect the position of the accelerator, a controller to adjust a reaction force of the accelerator, wherein the controller is configured to increase the reaction force of the accelerator from the basic reaction force when the position of the accelerator is depressed to satisfy a predetermined condition that is associated with a specific fuel consumption of the vehicle, wherein the basic reaction force increases at a first rate of force increase in accordance with an increase of the depression of the accelerator when the position of the accelerator is depressed from a zero position to a first position, wherein the basic reaction force increases at a second rate of force increase in accordance with the increase of the depression of the accelerator when the position of the accelerator is depressed from the first position of the accelerator to a second position of the accelerator, and wherein the controller is configured to increase the reaction force by a first amount from the basic reaction force when the position of the accelerator is depressed from the zero position or between the zero position and the first position to a position that satisfied the predetermined condition, and by a second amount from the basic reaction force when the position of the accelerator is depressed from an intermediate accelerator position that is larger than the first position to the position that satisfies the predetermined condition, the first amount being larger than the second amount.

BRIEF DESCRIPTION OF DRAWINGS

Features of the present disclosure will become more apparent from the following description in conjunction with the accompanying drawings.

FIGS. 4A and 4B illustrate a first exemplary comparative example of an accelerator-pedal reaction force control apparatus based on a lock-up clutch, wherein FIG. 4A is a characteristic diagram showing the accelerator-pedal reaction force versus the accelerator opening degree and FIG. 4B is a characteristic diagram showing a lock-up area;

FIGS. 5A and 5B illustrate a second exemplary comparative example of an accelerator-pedal reaction force control apparatus based on a fuel-increasing area, wherein FIG. 5A is a characteristic diagram showing the accelerator-pedal reaction force versus the accelerator opening degree and FIG. 5B is a characteristic diagram showing the fuel-increasing area;

FIGS. 6A and 6B illustrate a third exemplary comparative example of an accelerator-pedal reaction force control apparatus based on a fuel characteristic of an engine, wherein FIG. 6A is a characteristic diagram showing the accelerator-pedal reaction force versus the accelerator opening degree and FIG. 6B is a characteristic diagram showing equivalent fuel efficiency curves;

FIGS. 7A and 7B illustrate a fourth exemplary comparative example of an accelerator-pedal reaction force control apparatus based on a down-shifting operation of an automatic transmission, wherein FIG. 7A is a characteristic diagram showing the accelerator-pedal reaction force versus the accelerator opening degree and FIG. 7B is a graph showing speed-changing operations of the automatic transmission;

FIG. 12 is a flowchart of a control process performed by the accelerator-pedal reaction force control apparatus according to embodiments of the present disclosure.

DETAILED DESCRIPTION

Exemplary embodiments of the present disclosure will be described in detail below with reference to the drawings.

Figure 1:
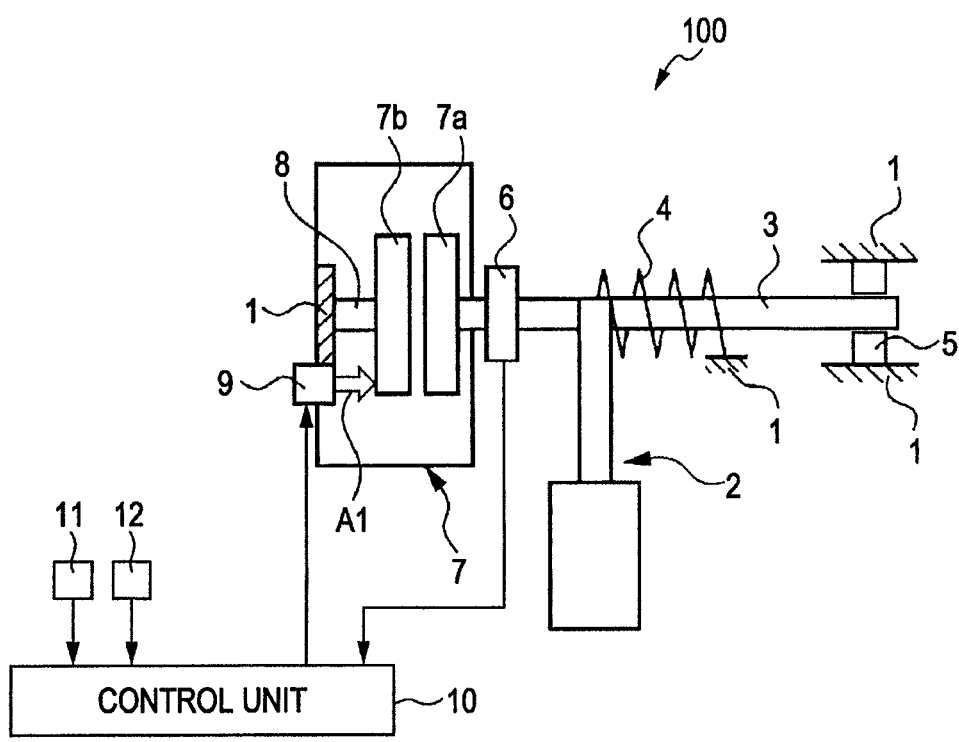
FIG. 1 is a schematic diagram illustrating the system structure of an accelerator-pedal reaction force control apparatus in accordance with embodiments of the present disclosure together with a reaction-force changing mechanism.

FIG. 1 is a schematic diagram illustrating the system structure of an accelerator-pedal reaction force control apparatus 100. An accelerator-pedal reaction force control apparatus 100 may control a reaction force (operational reaction force) of an accelerator pedal 2 provided in a vehicle body 1 of a vehicle (not shown). While the term "accelerator pedal" or "accelerator" is used throughout this specification, it should be understood that such terms should not be limited to any particular embodiment or style of input device. In particular, while a "pedal" inside the passenger compartment is described, it should be understood that the "accelerator" may be a device in the engine compartment responsive to electrical, hydraulic, or mechanical signals produced by a pedal (or other device) in the passenger compartment. Additionally, while the device in the passenger compartment is described as a pedal, it should be understood that various other regulating devices (e.g., levers, switches, buttons, etc) may be used as "accelerators" or as devices that signal an "accelerator." As described below, the accelerator-pedal reaction force control apparatus 100 may include means for detecting an amount of depression (accelerator opening degree) of the accelerator pedal 2 provided in the vehicle, and means for changing the reaction force of the accelerator pedal 2 from a basic reaction force. In the present exemplary embodiment, if the opening degree of the accelerator pedal 2 exceeds a predetermined accelerator-opening-degree threshold, the reaction force of the accelerator pedal 2 may be increased from the basic reaction force.

Figure 2:
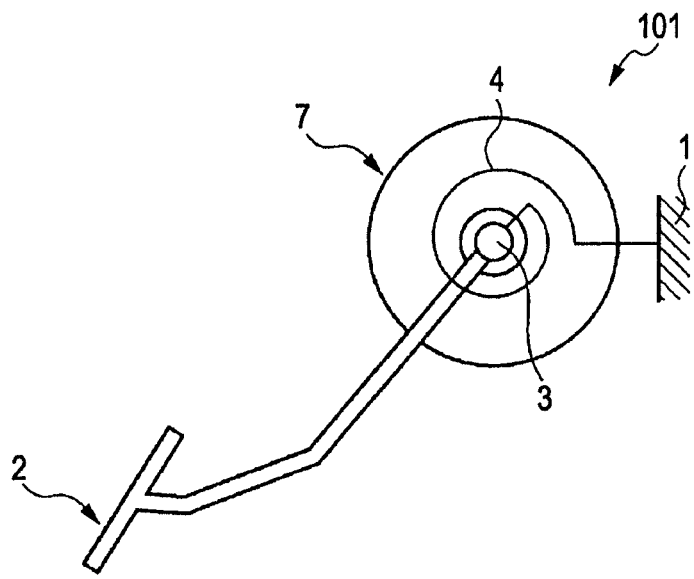
FIG. 2 is a schematic diagram illustrating an example of a reaction-force changing mechanism according to embodiments the present disclosure.

FIG. 2 is a diagram illustrating an example of a reaction-force changing mechanism 101. As shown in FIGS. 1 and 2, the accelerator pedal 2 may be provided on a rotating shaft 3 such that the accelerator pedal 2 may pivot about the rotating shaft 3. The accelerator pedal 2 may receive a reaction force in a closing direction thereof from a return spring 4 which may be fixed to the vehicle body 1 at one end thereof and to the rotating shaft 3 at the other end thereof. Various types of springs may be used as the return spring 4. The rotating shaft 3 may be rotatably supported by a bearing 5 provided on the vehicle body 1 at one end thereof. An accelerator stroke sensor 6, which may serve as the accelerator-opening-degree detecting means and outputs an accelerator-opening-degree signal APS, may be provided near to the other end of the rotating shaft 3. In addition, an engine rotational speed sensor 11, which may detect an engine rotational speed Ne, and a vehicle speed sensor 12, which may detect a vehicle speed VSP, may be provided.

In the present exemplary embodiment, an amount of depression of the accelerator pedal 2 (accelerator opening degree APS) and an opening degree of a throttle valve (not shown) of an engine (not shown) may be associated with each other so that the throttle valve opening of the engine increases in accordance with the amount of depression of the accelerator pedal 2. Thus, the amount of fuel injection (specific fuel consumption) increases in accordance with the accelerator opening degree.

A reaction-force changing mechanism 101 may include a variable friction plate 7 which may further include a pair of friction members 7a and 7b which face each other and which apply a frictional force against the rotation of the rotating shaft 3. One friction member 7a may be mechanically fixed to an end portion of the rotating shaft 3, and the other friction member 7b may be supported by a fixed shaft 8 with a spline or the like provided therebetween so that the friction member 7b may be movable in an axial direction but is not rotatable. The fixed shaft 8 may be fixed to and supported by the vehicle body 1. An actuator (for example, an electromagnetic solenoid) 9 which is capable of urging the friction member 7b against the friction member 7a may be fixed to the vehicle body 1.

In the variable friction plate 7, the actuator 9 may operate to move the friction member 7b in the axial direction (direction shown by the arrow A1 in FIG. 1), and thereby change the frictional force applied between the friction member 7a and the friction member 7b. The operation of the actuator 9 may be controlled by a control unit 10. Therefore, the control unit 10 may be capable of controlling the operation of the actuator 9 so as to change the reaction force of the accelerator pedal 2 against the depression thereof by changing the frictional force applied to the rotating shaft 3.

Figure 3:
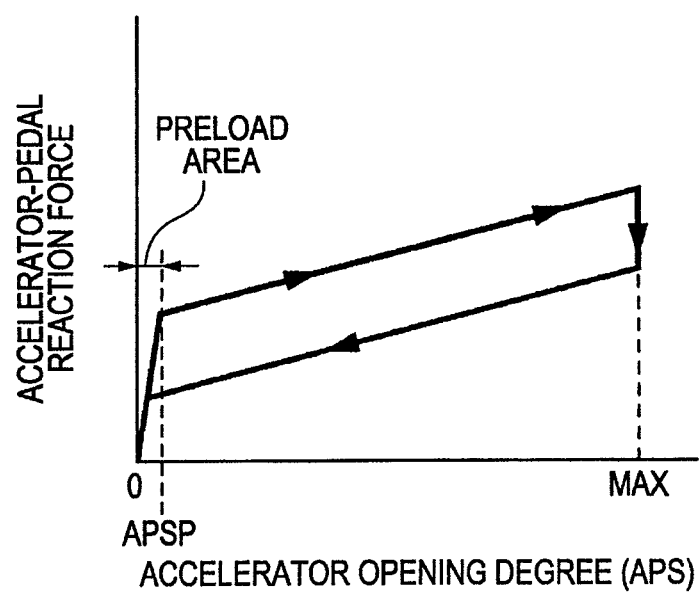
FIG. 3 is a characteristic diagram showing the characteristic of the basic reaction force of the accelerator pedal according to embodiments the present disclosure.

FIG. 3 schematically shows the characteristic of the accelerator-pedal reaction force according to the present exemplary embodiment. The basic reaction force substantially changes in proportion to the accelerator opening degree with a suitable hysteresis depending on whether the accelerator pedal is operated in an opening-degree-increasing direction or in an opening-degree-reducing direction. In addition, an initial area (preload area) in which the basic reaction force is rapidly increased may be provided in an area in which the accelerator opening degree APS is small.

More specifically, as shown in FIG. 3, when the accelerator opening degree is increased, the basic reaction force increases in proportion to the accelerator opening degree APS in a range from a minimum opening degree (accelerator opening degree APSP) to a maximum opening degree (accelerator opening degree MAX). In an initial area of the accelerator opening degree APS from 0 degrees to the minimum opening degree (accelerator opening degree APSP), the reaction force increases in proportion to the accelerator opening degree APS at a relatively large rate of increase. This area is called the preload area.

The control unit 10 may set an accelerator-opening-degree threshold associated with the specific fuel consumption on the basis of a driving state of the vehicle or the engine.

As an example, a case in which the accelerator-opening-degree threshold is set in accordance with the state of engagement or disengagement of a lock-up clutch in automatic transmission, including a torque converter, will be described with reference to FIGS. 4A and 4B. As is well known, the lock-up clutch is a mechanism for directly connecting an input and an output of the torque converter to each other. As shown in the characteristic diagram of FIG. 4B, the lock-up clutch is switched between an engaged state and a disengaged state in accordance with the vehicle speed VSP and the accelerator opening APS. The lock-up clutch is disengaged in a non-lockup (NON L/U) area (shaded area in FIG. 4B) in which the vehicle speed is low and the accelerator opening APS is large, and is engaged in a lockup (L/U) area in which the vehicle speed is high and the accelerator opening APS is small. In the state in which the lock-up clutch is disengaged, the specific fuel consumption is higher than that in the state in which the lock-up clutch is engaged. Therefore, in the case where the accelerator-opening-degree threshold is set in accordance with the state of engagement or disengagement of the lock-up clutch, the non lock-up area is considered to correspond to an operating range with a high specific fuel consumption, and the lock-up area is considered to correspond to an operating range with a low specific fuel consumption. When the accelerator opening degree APS is increased such that the state of the lock-up clutch changes from the lock-up area to the non lock-up area, the accelerator-pedal reaction force is increased.

Figure 4A:
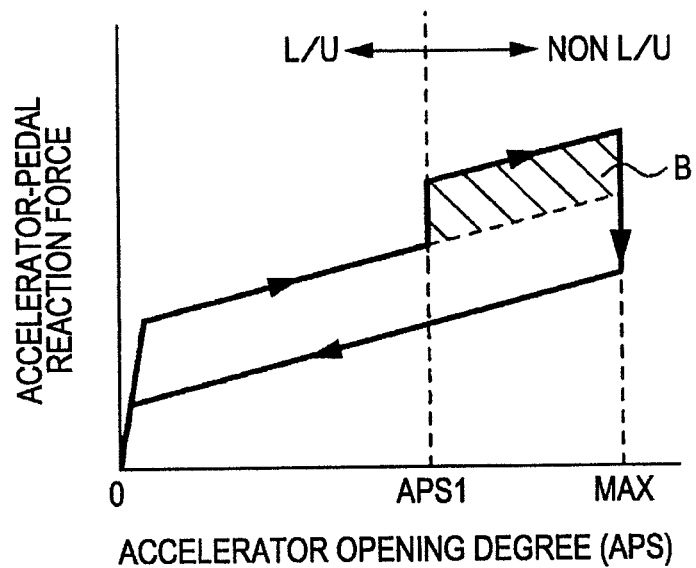
Figure 4B:
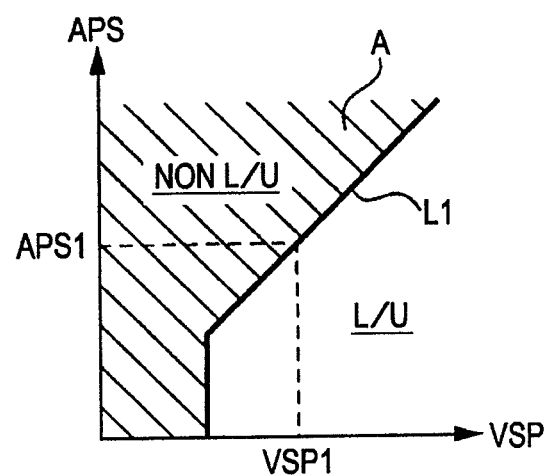

FIG. 4A shows the characteristic of the accelerator-pedal reaction force. The control unit 10 refers to the characteristic diagram shown in FIG. 4B and determines whether the lock-up clutch is in the disengaged state (NON L/U area) or the engaged state (L/U area) on the basis of the vehicle speed VSP and the accelerator opening degree APS. In the case where the lock-up clutch is in the engaged state (L/U area), an accelerator opening threshold APS1 for increasing the reaction force is set to the accelerator opening APS corresponding to the vehicle speed VSP input from the vehicle speed sensor on the boundary line L1 between the L/U area and the NON L/U area shown in FIG. 4B. As shown in FIG. 4B, when, for example, the vehicle speed is VSP1, the corresponding accelerator opening degree APS1 is set as the accelerator-opening-degree threshold for increasing the reaction force applied to the accelerator pedal 2.

When the accelerator opening degree APS detected by the accelerator stroke sensor 6 is increased and exceeds the accelerator-opening-degree threshold APS1, the control unit 10 may output a command signal to the actuator 9 and cause the actuator 9 to increase the reaction force applied by the variable friction plate 7 stepwise. Thus, an amount of increase in the reaction force denoted by B in FIG. 4A is added to the basic reaction force. This corresponds to the switching point between the engaged state and the disengaged state of the lock-up clutch, as described above. The amount of increase B in the reaction force is continuously added to the basic reaction force for the pedal-depressing direction of the accelerator pedal within the range of accelerator opening degree up to the maximum accelerator opening degree.

When the accelerator-pedal reaction force is increased stepwise at the accelerator-opening-degree threshold APS1 which corresponds to disengaging of the lock-up clutch, the driver may feel that the force required to depress the accelerator pedal 2 has been increased. Therefore, excessive depression of the accelerator pedal 2 by the driver may be suppressed and the driver may be informed that the driving state has been changed to a state in which the specific fuel consumption is high (fuel efficiency is low). The accelerator opening APS at which the state of the lock-up clutch changes from the engaged state to the disengaged state may not be constant, but may differ in accordance with the vehicle speed VSP. Even though the accelerator opening APS at which the state of the lock-up clutch changes to the disengaged state varies, the reaction force of the accelerator pedal 2 may be changed (the force required to depress the accelerator pedal 2 is increased) in accordance with the accelerator opening degree APS that varies. Therefore, the driver may be accurately informed that the operational area is changed from the operational area with a relatively low specific fuel consumption to the operational area with a relatively high specific fuel consumption.

The increase in the reaction force of the accelerator pedal 2 for the accelerator-opening-degree increasing direction may be immediately eliminated when, for example, the operating direction of the accelerator pedal 2 is changed to an accelerator-opening-degree reducing direction, or when the accelerator opening degree APS is reduced and becomes equal to or less than the above-described predetermined accelerator-opening-degree threshold APS1.

Figure 5A:
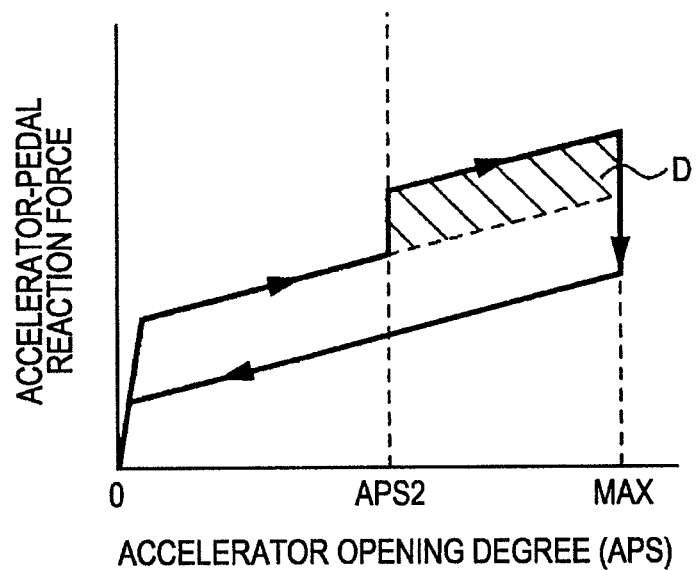
Figure 5B:
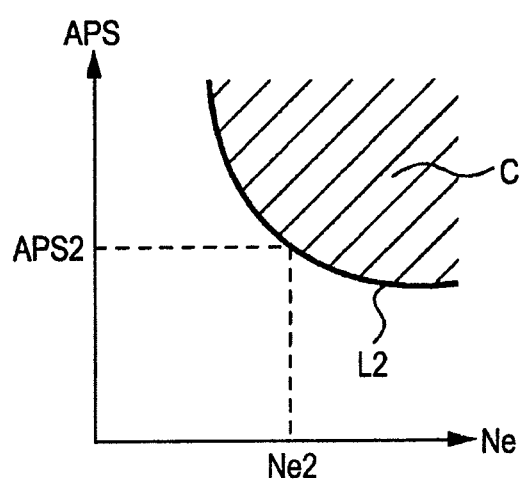

FIGS. 5A and 5B show a case in which the accelerator-opening-degree threshold is set in accordance with a fuel-increasing area at a high-load side of the engine.

FIG. 5A shows the characteristic of the reaction force of the accelerator pedal 2 with respect to the accelerator opening degree APS. FIG. 5B shows the fuel-increasing area (shaded area C) which is determined on the basis of the accelerator opening APS and the engine rotational speed Ne. The fuel-increasing area C may be generated due to switching of the setting of the air-fuel ratio or switching of the combustion method (for example, switching between stratified combustion and homogeneous combustion). As shown in FIG. 5B, the fuel-increasing area C is at an area where the accelerator opening degree APS is large and the engine rotational speed Ne is high. Therefore, an accelerator opening degree corresponding to the current engine rotational speed Ne (for example, Ne2) on the boundary line L2 shown in FIG. 5B is set as an accelerator-opening-degree threshold APS2. When the accelerator opening degree APS exceeds the accelerator-opening-degree threshold APS2, an amount of increase D in the reaction force is added to the basic reaction force for the pedal-depressing direction.

The accelerator-pedal reaction force may be controlled as shown in FIG. 5A. Accordingly, the force required to depress the accelerator pedal 2 may be increased when the operational state of the engine enters the fuel-increasing area. Therefore, the driver may be accurately informed that the operational state of the engine has been changed from the operational area with a relatively low specific fuel consumption to the operational area with a relatively high specific fuel consumption. Therefore, unintentional depression of the accelerator pedal 2 by the driver in the operational area with a high specific fuel consumption may be suppressed and the fuel efficiency may be increased.

Figure 6A:
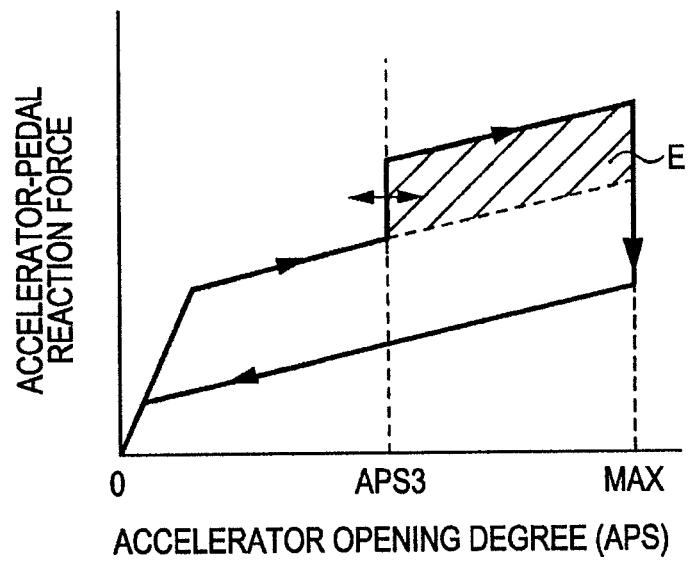
Figure 6B:
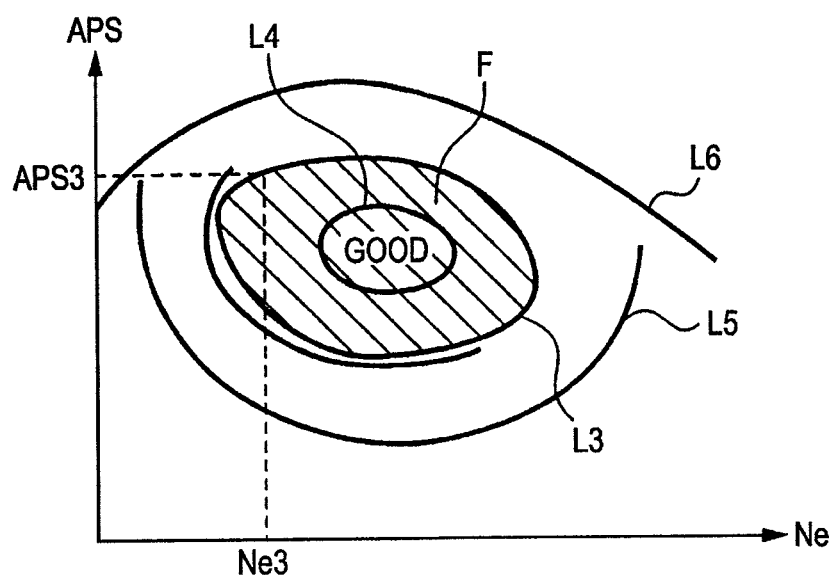

FIGS. 6A and 6B show a case in which the accelerator-opening-degree threshold is set in accordance with the characteristic of fuel efficiency of the engine.

FIG. 6A shows the characteristic of the reaction force of the accelerator pedal 2 with respect to the accelerator opening degree APS. FIG. 6B shows equivalent fuel efficiency curves L3 to L6, on which the specific fuel consumption is constant, with respect to the accelerator opening APS and the engine rotational speed Ne. As is clear from the equivalent fuel efficiency curves L3 to L6, in this example, the fuel efficiency is at a maximum in a middle-speed, middle-load area. The shaded area F is considered to be a high-fuel-efficiency area, and a boundary line of the shaded area F on the high-load side, that is, on the side at which the accelerator opening degree is large, is set as a boundary line between the high-fuel-efficiency area and a low-fuel-efficiency area. Therefore, an accelerator opening degree corresponding to the current engine rotational speed Ne (for example, Ne3) on the boundary line is set as an accelerator-opening-degree threshold APS3.

As shown in FIG. 6A, when the accelerator opening degree APS exceeds the accelerator-opening-degree threshold APS3, an amount of increase E in the reaction force is added to the basic reaction force for the pedal-depressing direction.

Since the accelerator-pedal reaction force may be controlled as described above, the force required to depress the accelerator pedal 2 may be increased when the operational state of the engine is out of the high-fuel-efficiency area F. Therefore, the driver may be accurately informed that the operational state of the engine has been changed from the operational area with a relatively low specific fuel consumption to the operational area with a relatively high specific fuel consumption. Therefore, unintentional depression of the accelerator pedal 2 by the driver in the operational area with a high specific fuel consumption may be suppressed and the fuel efficiency may be increased.

Figure 7A:
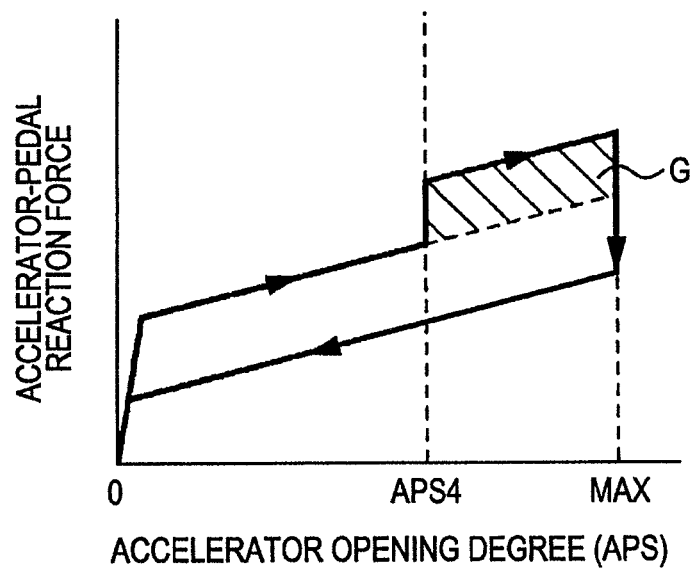
Figure 7B:
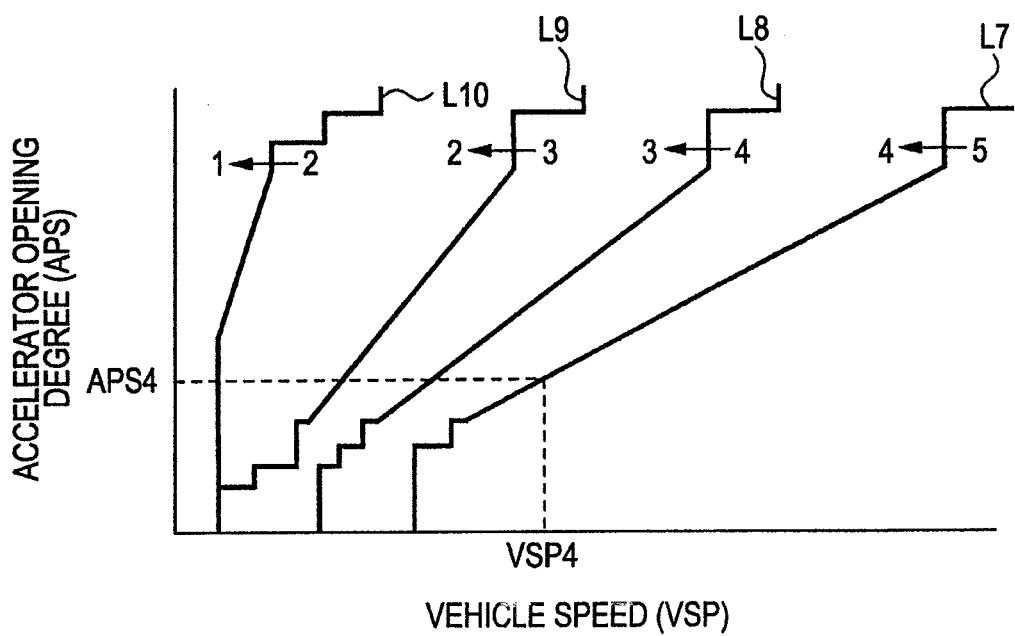

FIGS. 7A and 7B show a case in which the accelerator-opening-degree threshold is set in accordance with downshifting (automatic shifting to a lower-speed range) of an automatic transmission.

FIG. 7A shows the characteristic of the reaction force of the accelerator pedal 2 with respect to the accelerator opening degree APS. FIG. 7B is a graph illustrating the speed-changing operation performed by, for example, a five-speed automatic transmission. As shown in FIG. 7B, the speed-changing control is performed on the basis of the vehicle speed VSP and the accelerator opening APS. In general, the specific fuel consumptions for high speeds is lower than those for low speeds. Here, it is assumed that a speed-changing line L7 for downshifting from the fifth speed to the fourth speed functions as the boundary line between the operational area with a relatively low specific fuel consumption and the operational area with a relatively high specific fuel consumption. Therefore, an accelerator opening degree corresponding to the current vehicle speed VSP (for example, VSP4) on the boundary line L7 is set as an accelerator-opening-degree threshold APS4. Here, the accelerator-opening-degree threshold may also be set on the basis of other speed-changing lines L8 to L10 for changing between other speeds.

As shown in FIG. 7A, when the accelerator opening degree APS exceeds the accelerator-opening-degree threshold APS4, an amount of increase G in the reaction force may be added to the basic reaction force for the pedal-depressing direction.

Because the accelerator-pedal reaction force may be controlled as described above, the force required to depress the accelerator pedal 2 may be increased when the operation of shifting to a low-speed range, at which the specific fuel consumption is relatively high, is performed by the automatic transmission.

Figure 8:
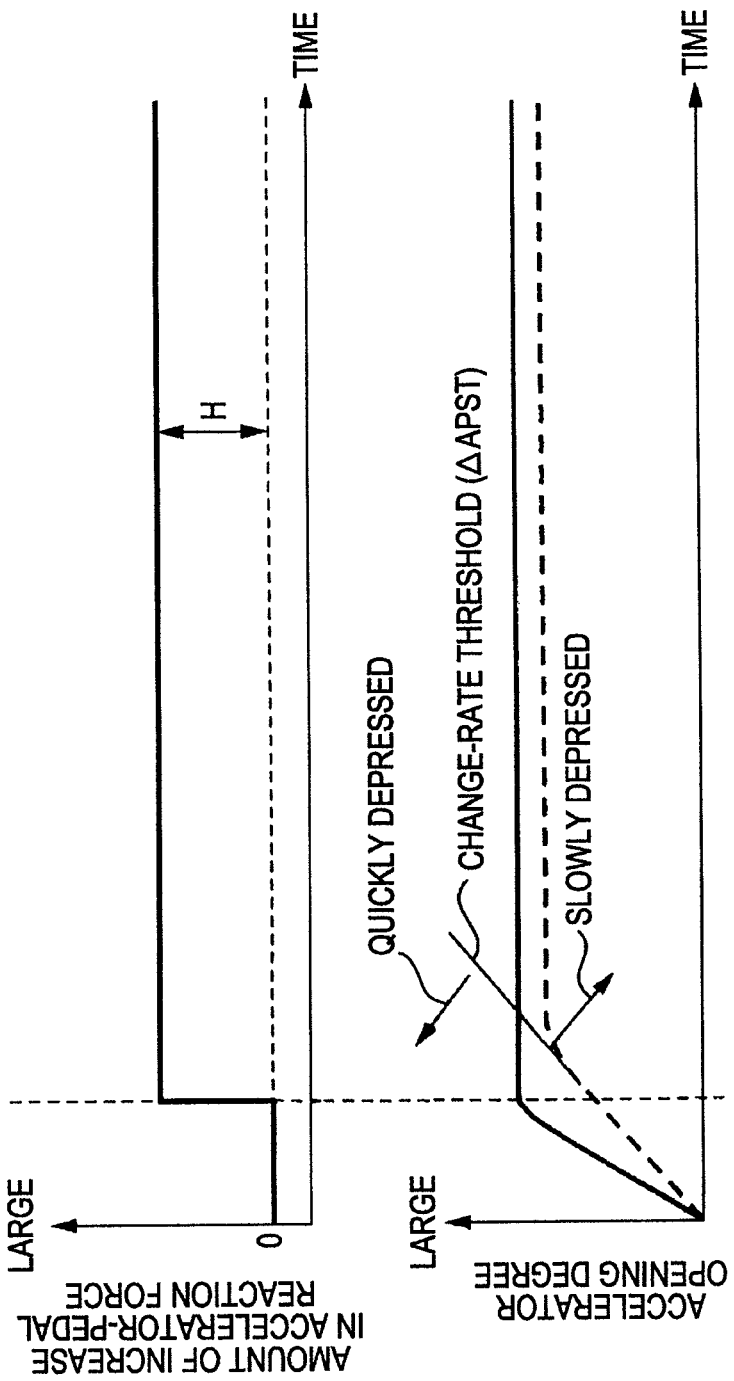
FIG. 8 is a timing chart showing the variation in the change rate of the accelerator opening degree and the accelerator-pedal reaction force.

In addition, as shown in FIG. 8, the reaction force may be increased in accordance with a change rate $\Delta APS$ of the accelerator opening degree.

More specifically, when the vehicle is started from a stopped state or accelerated, if the change rate $\Delta APS$ of the accelerator opening degree is larger than a predetermined change rate threshold $\Delta APST$ of the accelerator opening degree, an amount of increase H in the reaction force may be added to the basic reaction force for the pedal-depressing direction, as shown by the solid line in FIG. 8. In addition, when the vehicle is started from a stopped state or accelerated, if the change rate $\Delta APS$ of the accelerator opening degree is equal to or less than the change rate threshold $\Delta APST$, the amount of increase H in the reaction force may not be added to the basic reaction force for the pedal-depressing direction, as shown by the dashed line in FIG. 8.

The change rate threshold $\Delta APST$ for the change rate $\Delta APS$ of the accelerator opening degree may be changed in accordance with a vehicle speed at the time when the operation of increasing the opening degree of the accelerator pedal 2 is started by the driver, that is, in accordance with an initial vehicle speed at the time when the accelerator pedal 2 is depressed from a completely closed state or a partially opened state. More specifically, the change rate threshold $\Delta APST$ may be reduced as the vehicle speed decreases at the time when the operation of increasing the accelerator opening degree is started. The change rate threshold $\Delta APST$ for the change rate $\Delta APS$ of the accelerator opening degree may also be set in association with the specific fuel consumption.

As described above, when the accelerator pedal 2 is depressed, the reaction force may be suddenly increased on the basis of the accelerator opening degree APS or the change rate $\Delta APS$ thereof. According to the present disclosure, the amount of increase in the reaction force may be changed in accordance with the time when the depression of the accelerator pedal 2 is started.

Figure 9:
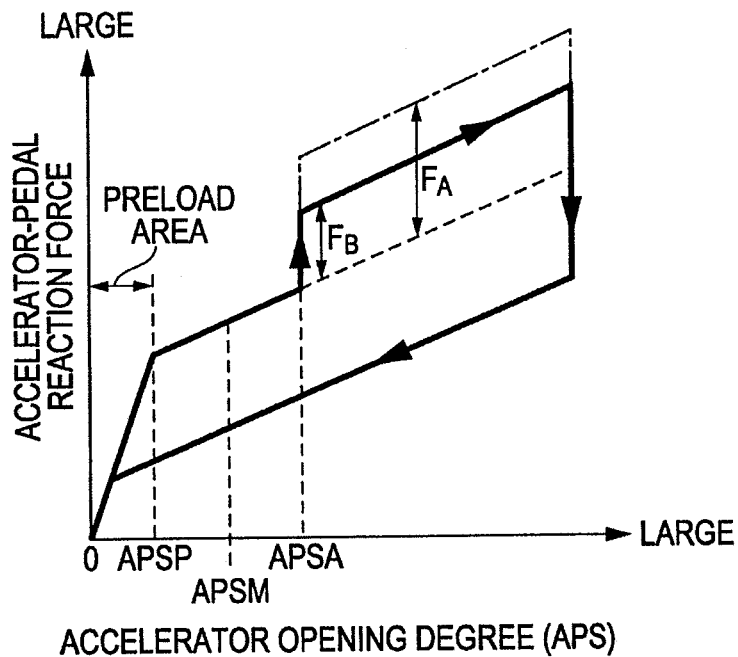
FIG. 9 is a characteristic diagram showing a first exemplary characteristic of the accelerator-pedal reaction force according to an exemplary embodiment.

FIG. 9 is a diagram illustrating the characteristics of the accelerator-pedal reaction force. In FIG. 9, the solid line shows the case in which the accelerator opening degree APS is increased beyond an accelerator-opening-degree threshold APSA from an intermediate opening degree (for example, accelerator opening degree APSM shown in FIG. 9) that is larger than the accelerator opening degree APSP which corresponds to the boundary of the above-described preload area. In addition, in FIG. 9, the dot-dash line shows the case in which the accelerator opening degree APS is increased beyond the accelerator-opening-degree threshold APSA from 0 degrees. The accelerator-opening-degree threshold APSA may correspond to any one of the above-described accelerator-opening-degree thresholds APS1 to APS4, which corresponds to the timings at which the operational state changes from the state with a relatively low specific fuel consumption to the state with a relatively high specific fuel consumption.

As shown in FIG. 9, an amount of increase FA added to the basic reaction force in the case where the accelerator opening degree APS is increased from 0 degrees and exceeds the accelerator-opening-degree threshold APSA is set to be larger than an amount of increase FB added to the basic reaction force in the case where the accelerator opening degree APS is increased from an intermediate opening degree (the intermediate opening degree is the degree that is smaller than fully open and greater than 0 degrees (i.e., in the fully-closed position)) and exceeds the accelerator-opening-degree threshold APSA.

Due to the preload area, in the case where the accelerator opening degree APS is increased from 0 degrees, the increase in the reaction force of the accelerator pedal 2 against the operation thereof felt by the driver is larger than that in the case where the accelerator opening degree APS is increased from an intermediate opening degree. The accelerator opening degree APS is increased from 0 degrees in the case where, for example, the vehicle is started from a stopped state. In such a case, because the driver starts depressing the accelerator pedal 2 while the vehicle speed is substantially 0, the driver tends to depress the accelerator pedal 2 by an excessively large amount to start the vehicle from a stopped state.

In such a situation, the driver may not recognize that the force required to depress the accelerator pedal 2 has been increased unless the reaction force of the accelerator pedal 2 is increased by a relatively large rate with respect to the basic reaction force of the accelerator pedal 2 for the pedal-depressing direction.

Therefore, the amount of increase in the reaction force added to the basic reaction force for the pedal-depressing direction in the case where the accelerator opening degree APS is increased from 0 degrees is set to a larger value than that in the case where the accelerator opening degree APS is increased from an intermediate opening degree. Thus, the driver may be accurately informed that the fuel efficiency may be reduced if the accelerator pedal 2 is excessively depressed.

In the present exemplary embodiment, if the accelerator opening degree APS is not increased from 0 degrees but is increased from a small accelerator-opening-degree area (that is, within the preload area) in which the accelerator opening degree APS is less than the accelerator opening degree APSP at the boundary of the preload area, the amount of increase may be set to either of the above-described two amounts of increase FA and FB. Alternatively, the amount of increase may also be set to a value between the above-described two amounts of increase FA and FB. However, because there is the influence of the increase in the basic reaction force in the preload area, the larger amount of increase FA is preferably added as in the case where the accelerator opening degree APS is increased from 0 degrees.

Figure 10:
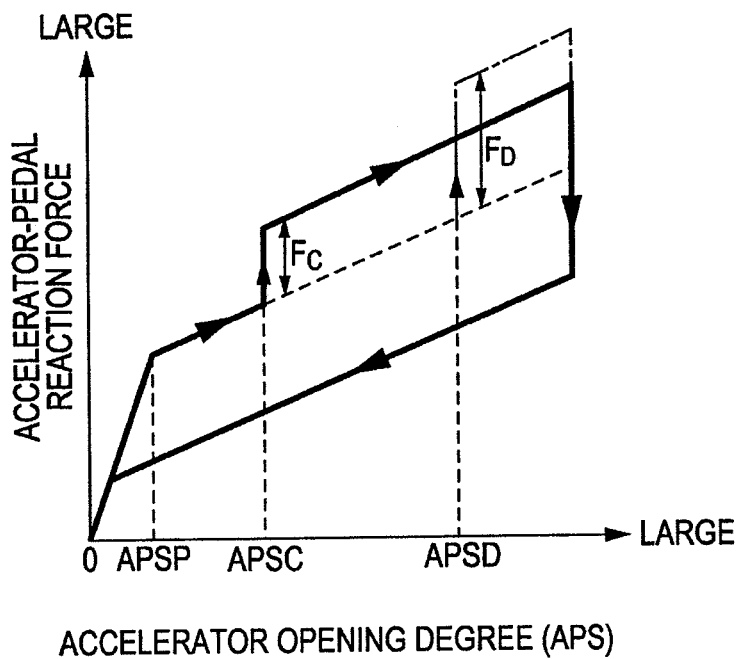
FIG. 10 is a characteristic diagram showing a second exemplary characteristic of the accelerator-pedal reaction force according to an exemplary embodiment.

The amount of increase in the reaction force added to the basic reaction force for the pedal-depressing direction of the accelerator pedal may be set to a constant value irrespective of the accelerator-opening-degree threshold APSA. However, as shown in FIG. 10, the amount of increase in the reaction force added to the basic reaction force for the pedal-depressing direction may also be increased in proportion to the accelerator-opening-degree threshold, which may be determined in accordance with, for example, the state of engagement or disengagement of the lock-up clutch. More specifically, the amount of increase FD for the accelerator-opening-degree threshold APSD may be set to a larger value than the amount of increase FC for the accelerator-opening-degree threshold APSC. In the case where the amount of increase in the reaction force from the basic reaction force for the pedal-depressing direction is increased in the above-described manner, the driver may be accurately informed regarding the change in the driving characteristic and the reduction in the fuel efficiency.

Figure 11:
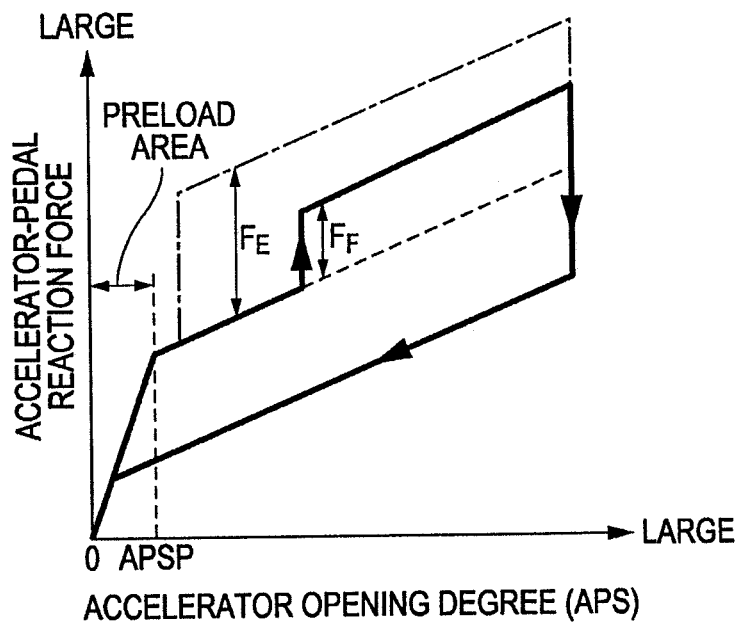
FIG. 11 is a characteristic diagram showing a third exemplary characteristic of the accelerator-pedal reaction force according to an exemplary embodiment.

In the example shown in FIG. 8, the increase in the reaction force is performed on the basis of the change rate $\Delta APS$ of the accelerator opening degree. As shown in FIG. 11, also in this case, the amount of increase in the reaction force added in the case where the accelerator opening degree APS is increased from 0 degrees is set to a larger value than that in the case where the accelerator opening degree APS is increased from an intermediate opening degree.

More specifically, in the case where the accelerator opening degree APS is increased from an intermediate opening degree and the change rate $\Delta APS$ of the accelerator opening degree exceeds the change rate threshold $\Delta APST$ for the change rate $\Delta APS$ of the accelerator opening degree (solid line in FIG. 11), the reaction force is increased by an amount FF. In the case where the accelerator opening degree APS is increased from 0 degrees and the change rate $\Delta APS$ of the accelerator opening degree exceeds the change rate threshold $\Delta APST$ (dot-dash line in FIG. 11), the reaction force is increased by an amount FE. Here, the amount of increase FE is set to a larger value than the amount of increase FF. Also in this case, the driver may be accurately informed that the fuel efficiency may be reduced if the accelerator pedal 2 is excessively depressed.

FIG. 12 is a flowchart of a control process performed by the accelerator-pedal reaction force control apparatus according to the present disclosure. The routine shown in this flowchart is executed to determine the amount of increase in the reaction force, and is executed under the condition that the accelerator opening degree APS is being changed in the increasing direction.

In step S1, it is determined whether or not the reaction force of the accelerator pedal 2 is already increased from the basic reaction force for the pedal-depressing direction. If the reaction force is already increased from the basic reaction force, the routine is ended.

In S2, the vehicle speed and the engine rotational speed are determined.

In S3, the accelerator-opening-degree thresholds and the change rate threshold (APS1 to APS4 and $\Delta APST$) are set in accordance with the current operational state.

In S4, it is determined whether or not the current accelerator opening degree APS exceeds the first determination threshold APS1. If the result of the determination is YES, the process proceeds to S9. If the result of the determination is NO, the process proceeds to S5.

In S5, it is determined whether or not the current accelerator opening degree APS exceeds the first determination threshold APS2. If the result of the determination is YES, the process proceeds to S9. If the result of the determination is NO, the process proceeds to S6.

In S6, it is determined whether or not the current accelerator opening degree APS exceeds the first determination threshold APS3. If the result of the determination is YES, the process proceeds to S9. If the result of the determination is NO, the process proceeds to S7.

In S7, it is determined whether or not the current accelerator opening degree APS exceeds the first determination threshold APS4. If the result of the determination is YES, the process proceeds to S9. If the result of the determination is NO, the process proceeds to S8.

In S8, it is determined whether or not the current change rate $\Delta APS$ of the accelerator opening degree exceeds the change rate threshold $\Delta APST$ of the accelerator opening degree. If the result of the determination is YES, the process proceeds to S9. If the result of the determination is NO, the routine is ended.

In S9, it is determined whether the accelerator opening degree APS has been increased from 0 degrees or from an intermediate accelerator opening degree. In other words, in S9, it is determined whether or not the accelerator opening degree APS has been continuously increased from 0 degrees. If the result of the determination is YES, the process proceeds to S10. If the result of the determination is NO, the process proceeds to S11. For example, if the accelerator opening degree APS is reduced even for a short time in the process of increasing the accelerator opening degree APS or if the accelerator opening degree APS is maintained at an intermediate opening degree other than 0 for a certain time and is then increased, the process proceeds to S11.

In S10, the reaction force of the accelerator pedal 2 is increased by the amount FA (or FE) from the basic reaction force for the pedal-depressing direction.

In S11, the reaction force of the accelerator pedal 2 is increased by the amount FB (or FF) from the basic reaction force for the pedal-depressing direction. As described above, the amount of increase FA (or FE) provided in S10 is larger than the amount of increase FB (or FF) provided in S11.

In the above-described exemplary embodiment, the reaction force of the accelerator pedal 2 is increased from the basic reaction force when the accelerator opening degree APS or the change rate $\Delta APS$ of the accelerator opening degree APS exceeds the corresponding thresholds (APS1 to APS4, $\Delta APST$). However, the reaction force of the accelerator pedal 2 may also be increased from the basic reaction force when both of the accelerator opening degree APS and the change rate $\Delta APS$ of the accelerator opening degree APS exceed the corresponding thresholds (APS1 to APS4, $\Delta APST$).

In addition, in the above-described exemplary embodiment, the reaction force of the accelerator pedal 2 is increased at the time when the operation changes from the range with a relatively low specific fuel consumption to the range with a relatively high specific fuel consumption. However, the reaction force may also be increased immediately before the operation actually enters the range with a relatively high specific fuel consumption (that is, while the accelerator opening degree APS is slightly smaller than that at the boundary corresponding to the switching point). In such a case, the driver may be informed of the prediction that the fuel efficiency will be reduced in advance. Accordingly, the driver may be informed that the fuel efficiency is expected to be reduced, and may intentionally avoid the situation that the operation enters the range with a high specific fuel consumption. Therefore, the fuel efficiency may be further improved.

Advantageously, accelerator-pedal reaction force control apparatus in accordance with embodiments disclosed herein may include an accelerator pedal of a vehicle, the accelerator pedal receiving a basic reaction force which may increase as an accelerator opening degree increases; an accelerator-opening-degree detecting unit for detecting the accelerator opening degree which changes when the accelerator pedal is operated; a reaction-force changing unit for changing the reaction force of the accelerator pedal; and a controller which controls the reaction-force changing unit.

Advantageously, the controller may increase the reaction force of the accelerator pedal from the basic reaction force when the accelerator opening degree is increased to satisfy a predetermined condition that is associated with a specific fuel consumption of the vehicle. The controller may set an amount of increase from the basic reaction force for when the accelerator opening degree is increased from 0 degrees to satisfy the predetermined condition to be larger than an amount of increase from the basic reaction force for when the accelerator opening degree is increased from an intermediate accelerator opening degree to satisfy the predetermined condition.

Advantageously, the driver may easily recognize that the force required to depress the accelerator pedal has been increased if the reaction force is increased by a predetermined percentage or more or by a predetermined amount or more with respect to the basic reaction force for the depressing direction of the accelerator pedal. Therefore, in the process of increasing the reaction force of the accelerator pedal from the basic reaction force when the accelerator opening degree is increased to satisfy the predetermined condition associated with the specific fuel consumption, the amount of increase may be set as follows. That is, the amount of increase from the basic reaction force for when the accelerator opening degree may be increased from 0 degrees to satisfy the predetermined condition may be set to be larger than the amount of increase from the basic reaction force for when the accelerator opening degree is increased from an intermediate accelerator opening degree to satisfy the predetermined condition. Thus, the information that the fuel efficiency is being reduced due to the excessive depression of the accelerator pedal may be reliably presented to the driver.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An accelerator control apparatus of a vehicle, comprising:
   a means for detecting a position of an accelerator;
   a means for adjusting a reaction force of the accelerator;
   the accelerator configured to receive a basic reaction force which increases as an accelerator opening degree increases; and
   wherein the means for adjusting increases the reaction force of the accelerator by an increase amount in addition to the basic reaction force when the position of the accelerator is increased to satisfy a predetermined condition associated with a specific fuel consumption of the vehicle;
   wherein the means for adjusting sets the increase amount to a first amount when the position of the accelerator is increased from a first accelerator position in a preload area to a second accelerator position that satisfies the predetermined condition;
   wherein the means for adjusting sets the increase amount to a second amount when the position of the accelerator is increased from an intermediate accelerator position that exceeds the preload area to the second position;
   wherein the first amount is greater than the second amount.

2. The accelerator control apparatus of claim 1, wherein the position of the accelerator comprises an accelerator opening degree.

3. The accelerator control apparatus of claim 1, wherein a rate of the basic reaction force increase in accordance with the increase of the accelerator opening degree when the accelerator opening degree increases in the preload area is larger than the rate of the basic reaction force increase when the accelerator opening degree increases from the intermediate accelerator position.

4. The accelerator control apparatus of claim 1, wherein the basic reaction force increases proportionally with the position of the accelerator from a minimum position of the intermediate accelerator position to a maximum position as the position of the accelerator is increased.

5. The accelerator control apparatus of claim 1, wherein the basic reaction force increases from a minimum position of the intermediate accelerator position to a maximum position at a second rate of increase in proportion with an increase in the accelerator position, and wherein the basic reaction force increases from 0 degrees to the minimum position in accordance with an increase in the accelerator position at a first rate of increase which is larger than the second rate of increase.

6. The accelerator control apparatus of claim 1, wherein the means for adjusting sets a predetermined accelerator-position threshold in association with the specific fuel consumption, and wherein the means for adjusting determines that the predetermined condition is satisfied when the accelerator position is increased and exceeds the predetermined accelerator-position threshold.

7. The accelerator control apparatus of claim 1, wherein the means for adjusting sets a predetermined change rate threshold for the accelerator position in association with the specific fuel consumption, and wherein the means for adjusting determines that the predetermined condition is satisfied when a change rate of the accelerator position exceeds the predetermined change rate threshold.

8. The accelerator control apparatus of claim 1, wherein the first accelerator position comprises a zero position of the accelerator.

9. The accelerator control apparatus of claim 1, wherein the intermediate accelerator position is larger than a zero position and is smaller than a fully opened position.

10. The accelerator control apparatus of claim 4, wherein the first accelerator position is equal to or larger than 0 degrees of opening and is smaller than the minimum position.

11. The accelerator control apparatus of claim 10, wherein the intermediate accelerator position is larger than the minimum position and is smaller than a fully opened position.

12. The accelerator control apparatus of claim 1, wherein the accelerator comprises an accelerator pedal.

13. An accelerator control apparatus comprising:
a vehicle accelerator receiving a basic reaction force increasing as a position of the vehicle accelerator increases;
a means for detecting the position of the accelerator;
a means for adjusting a reaction force of the accelerator; and
wherein the means for adjusting increases the reaction force of the accelerator from the basic reaction force when the position of the accelerator is increased to satisfy a predetermined condition that is associated with a specific fuel consumption of the vehicle,
wherein the basic reaction force increases from a first position of the accelerator to a second position of the accelerator at a second rate of force increase when the position of the accelerator is increased,
wherein the basic reaction force increases at a first rate of force increase which is larger than the second rate of force increase in accordance with an increase in the position of the accelerator from a zero position to the first position, and
wherein the means for adjusting increases the reaction force by a second amount from the basic reaction force when the position of the accelerator is increased from an intermediate accelerator position that is larger than the first position to a position that satisfies the predetermined condition, and by a first amount when the position of the accelerator is increased from the position that is equal to the zero position or less than the first position to the position that satisfies the predetermined condition, the first amount being larger than the second amount.

14. The accelerator reaction force control apparatus according to claim 13, wherein the accelerator position comprises an accelerator opening degree.

15. The accelerator reaction force control apparatus according to claim 13, wherein the means for adjusting sets a predetermined accelerator-position threshold in association with the specific fuel consumption, and wherein the predetermined condition is satisfied when the position of the accelerator is increased and exceeds the predetermined accelerator-position threshold.

16. The accelerator reaction force control apparatus according to claim 13, wherein the means for adjusting sets a predetermined change rate threshold for the position of the accelerator in association with the specific fuel consumption, and wherein the predetermined condition is satisfied when a change rate of the position of the accelerator exceeds the predetermined change rate threshold.

17. The accelerator reaction force control apparatus according to claim 13, wherein the accelerator comprises an accelerator pedal.

18. A method to control an accelerator of a vehicle, the method comprising:
detecting a position of an accelerator;
adjusting a reaction force of the accelerator;
applying a basic reaction force to the accelerator which increases as an accelerator opening degree increases; and
increasing the reaction force of the accelerator by an increase amount in addition to the basic reaction force when the position of the accelerator is increased to satisfy a predetermined condition associated with a specific fuel consumption of the vehicle;
setting the increase amount to a first amount when the position of the accelerator is increased from a first accelerator position to a second accelerator position that satisfies the predetermined condition;
setting the increase amount to a second amount when the position of the accelerator position is increased from an intermediate accelerator position to the second position; and
wherein the accelerator opening degree of the intermediate accelerator position is larger than the accelerator opening degree of the first accelerator position, wherein the first amount is greater than the second amount.

19. An accelerator control apparatus of a vehicle, comprising:
a detector to detect a position of an accelerator; and
a controller to adjust a reaction force of the accelerator;
wherein, the accelerator is configured to receive a basic reaction force which increases as an accelerator opening degree increases,
wherein the controller is configured to increase the reaction force of the accelerator by an increase amount in addition to the basic reaction force when the position of the accelerator is increased to satisfy a predetermined condition associated with a specific fuel consumption of the vehicle,
wherein the controller is configured to set the increase amount to a first amount when the position of the accelerator is increased from a first accelerator position to a second accelerator position that satisfies the predetermined condition,
wherein the controller is configured to set the increase amount to a second amount when the position of the accelerator is increased from an intermediate accelerator position to the second position,
wherein the accelerator opening degree of the intermediate accelerator position is larger than the accelerator opening degree of the first accelerator position, and
wherein the first amount is greater than the second amount.

20. An accelerator control apparatus comprising:
a vehicle accelerator receiving a basic reaction force increasing as a depression of the vehicle accelerator increases;
a detector to detect the position of the accelerator; and
a controller to adjust a reaction force of the accelerator,
wherein the controller is configured to increase the reaction force of the accelerator from the basic reaction force when the position of the accelerator is depressed to satisfy a predetermined condition that is associated with a specific fuel consumption of the vehicle,
wherein the basic reaction force increases at a first rate of force increase in accordance with an increase of the depression of the accelerator when the position of the accelerator is depressed from a zero position to a first position, wherein the basic reaction force increases at a second rate of force increase in accordance with the increase of the depression of the accelerator when the position of the accelerator is depressed from the first position of the accelerator to a second position of the accelerator, wherein the first rate of force increase is larger than the second rate of force increase, and
wherein the controller is configured to increase the reaction force by a first amount from the basic reaction force when the position of the accelerator is depressed from the zero position or between the zero position and the first position to a position that satisfies the predetermined condition, and by a second amount from the basic reaction force when the position of the accelerator is depressed from an intermediate accelerator position that is larger than the first position to the position that satisfies the predetermined condition, wherein the first amount being larger than the second amount.

* * * * *